United States Patent [19]

Weiss

[11] Patent Number: 4,509,662
[45] Date of Patent: Apr. 9, 1985

[54] CAULKING GUN

[76] Inventor: Sherman L. Weiss, 17537 Devonshire St., Northridge, Calif. 91325

[21] Appl. No.: 457,661

[22] Filed: Jan. 13, 1983

[51] Int. Cl.³ .............................................. G01F 11/00
[52] U.S. Cl. ................................. 222/391; 222/327; 74/141.5
[58] Field of Search ............... 222/325, 326, 327, 386, 222/391, 470, 472–474; 74/141.5, 169, 148, 154

[56] References Cited

U.S. PATENT DOCUMENTS

| 2,530,359 | 11/1950 | Peterson | 222/327 |
| 2,776,075 | 1/1957 | Etter | 222/43 |
| 3,378,175 | 4/1968 | Krieps | 222/327 |
| 4,009,804 | 3/1977 | Costa et al. | 74/141.5 X |
| 4,330,070 | 5/1982 | Doubleday | 222/43 |
| 4,339,058 | 7/1982 | Wendt | 222/309 |
| 4,461,407 | 7/1984 | Finnegan | 222/391 |

Primary Examiner—Joseph J. Rolla
Assistant Examiner—Michael S. Huppert
Attorney, Agent, or Firm—Evanns & Walsh

[57] ABSTRACT

A caulking gun of the type having a cradle to receive a cartridge of compound having a piston in it and a dispensing nozzle. The gun has a handle and operating member or trigger which drives a stem having a thrust disk which engages the piston in the cartridge. A member is provided on the actuating stem to prevent further movement of the stem after the thrust disk and piston are in a position wherein the end member or cap on the end of the gun could be broken off. In that type of gun having a latch member or latch dog which requires manual release to allow rearward movement of the stem the stop member actuates the release member to release the stem for rearward movement.

1 Claim, 2 Drawing Figures

CAULKING GUN

BACKGROUND OF THE INVENTION

1. Field of the Invention

The filed of the invention is that of caulking guns. The invention is an improvement as described in detail hereinafter.

2. Description of the Prior Art

Caulking guns as such are well known in the art and widely used. Typically, conventional caulking guns are constructed to provide a cradle to receive a cartridge containing caulking compound which has a dispensing nozzle at one end and a piston within it which acts against the compound.

The caulking gun has a reciprocating stem having a thrust disk at the end which acts against the piston in the cartridge to force the caulking compound out of the nozzle. Typically, the stem is actuatable by a manual lever or trigger which actuates a driving dog which reciprocates the stem when the trigger is manipulated. Typically, the actuating dog acts against a spring. Prior art guns are shown in U.S. Pat. Nos. 1,986,166; 2,530,359; 2,561,825; and 4,081,112.

A problem with caulking guns has been that when operation of the gun is discontinued the flow of compound from the nozzle would continue because of failure of the force or pressure on the piston in the cartridge to be released. In some guns this problem is considered to be solved in that the construction always allows the stem to freely move rearwardly when it is not engaged by the driving dog for moving it forwardly.

Caulking guns are known which include latching means including a latch dog which engages the stem near the handle and which allows forward movement of the stem but which prevents backward movement unless this latch dog is released. Release of the latch dog allows the stem to move backward freely thus, relieving pressure against the cartridge piston.

Aside from the problem referred to above, there has been a significant deficiency in known caulking guns. This deficiency resides in the fact that the operator does not know the position of the rod and thrust disk and the piston in the cartridge such that at times after all of the compound has been driven out of the cartridge the piston is forced against the end member of the gun so as break it loose from the cradle to which it is secured. The herein invention, a detailed description of which appears hereinafter, is constructed whereby to overcome this deficiency and to prevent the end member or fitting of the gun from being broken off. The invention is intended to provide the improvement both in guns wherein the pressure or force on the driving stem is automatically released or in guns wherein the stem is released for rearward movement by way of a thumb latch.

SUMMARY OF THE INVENTION

In a preferred form of the invention the caulking gun is provided with the usual cradle for the cartridge of caulking compound and a driving stem with a disk on the end of it which engages the piston in the cartridge.

The actuating stem is provided with an abutment stop at a position on the driving stem so as to prevent further forward movement of the stem at a predetermined position which will prevent the stem from being driven forward sufficiently to force the piston against the end number of the gun so it cannot be broken off.

In a preferred form of the invention the abutment stop is positioned to engage the handle of the gun.

In another form of the invention adapted to that type of gun having a manual latch dog which normally prevents rearward movement of the stem and which can release the stem, the abutment is so positioned that it will positively limit forward movement of the stem for the purpose as described in the foregoing and further it will automatically release the manual latch dog so as to release the operating stem for return movement.

In the light of the foregoing, a primary object of the invention is to provide an improvement in caulking guns comprising stop means associated with the actuating stem of the gun so as to positively prevent the stem from being driven forward sufficiently against the piston in the cartridge so as to disengage the end member from the cradle of the gun.

A further object is to provide an improvement as in the foregoing object in caulking guns having a manually actuatable latch associated with the stem which normally prevents rearward movement of the stem, the stop means being positioned to limit forward movement of the stem and to automatically actuate the latch member so as to release the stem for rearward movement so as to release the force of the piston in the cartridge.

A further object is to provide improvements in the relationship between the trigger of the caulking gun and the driving dog and the driving stem for purposes of improved operation.

DESCRIPTION OF PREFERRED EMBODIMENT AND BEST MODE OF PRACTICE

Figure 1:
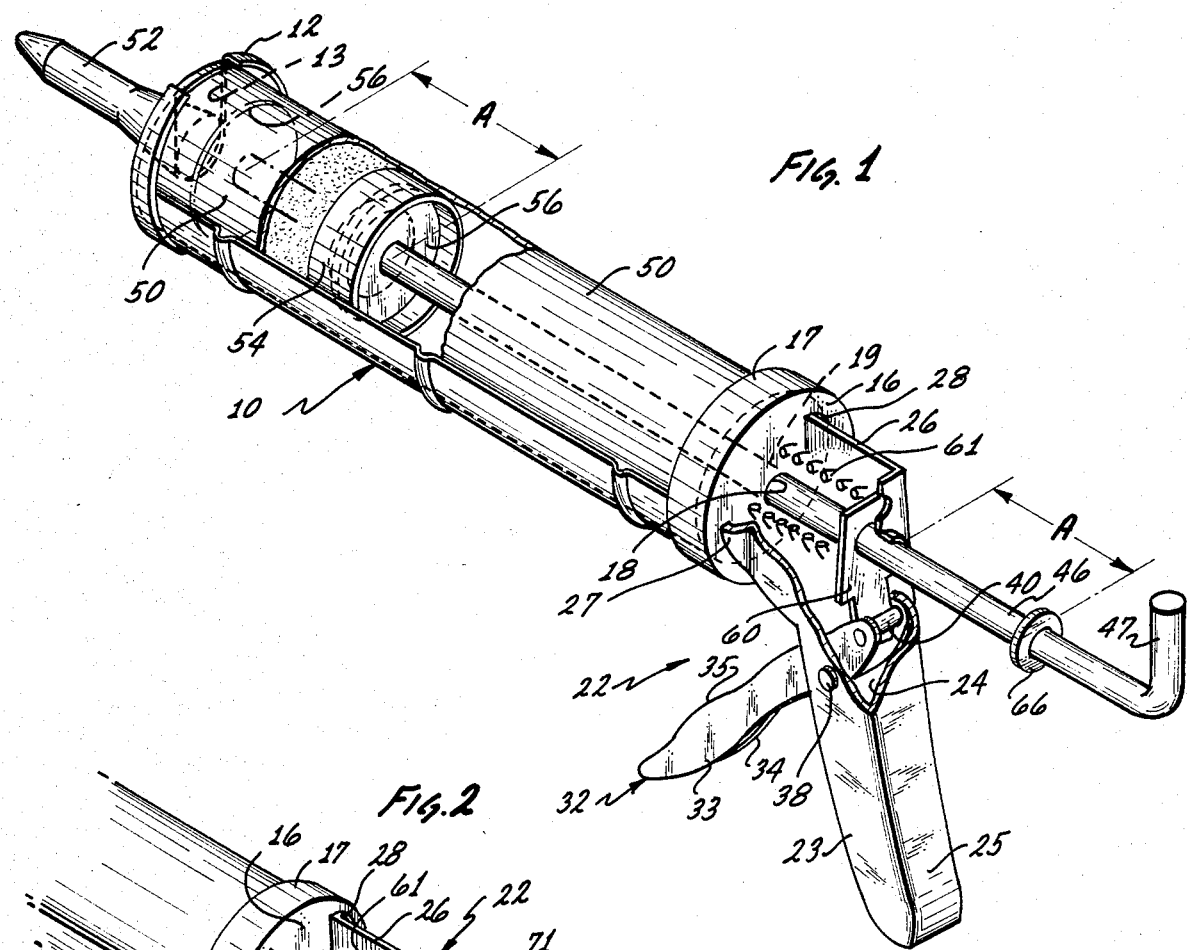
FIG. 1 is an isometric view of a preferred form of the invention.

Referring to FIG. 1 of the drawings the gun includes a cradle part which is in the form of a half a cylinder 10 being open at the top as shown. It may be made of any suitable material such as sheet metal.

At the front end of the cradle 10 is an end member or cap 12 having a flange which is secured to the cradle 10 by suitable means. The end member has an opening or cut out 13 in it through which the nozzle on a caulking cartridge can extend.

At the opposite end is a rear end member or end cap 16 having a flange 17 as shown, the end of the cradle 10 fitting into the end cap which is secured to the cradle. The end cap 16 has a central aperture 18 with a forwardly extending flange 19 (not shown) to receive the actuating stem.

The gun has a handle part as designated at 22 which preferably may be formed of sheet metal configurated to form side walls as designated at 23 and 24 with a back wall 25 and upper housing part 26. At the front part of the two side walls are extending flanges 27 and 28 which are secured to the end cap 16 by suitable means such as welding or riveting.

Numeral 32 designates an operating member or trigger which can be formed of sheet metal configurated to provide side walls 33 and 34 and wall 35 between side walls. Trigger 32 is pivotedly attached to the handle 22 by way of a transverse pivot stem 38.

At the upper end of the operating member or trigger 32 it carries a transverse pivot stem 40. Numeral 46 designates the actuating or drive stem forcing the caulking compound out of the cartridge. It has a right angle end part 47. A cartridge as designated by the numeral 50 is positioned in the cradle 10. The cartridge has a dispensing nozzle 52 which extends through the opening 13 in the end cap 12. The cartridges is of conventional construction and has a movable piston 54 in it which can be forced against the compound to force it out of the nozzle.

The actuating stem 46 has a disk 56 on its end forming a plunger which engages with the piston 54 in the cartridge.

A transverse pivot stem 40 carried by the trigger 32 engages against the bottom end of an actuating dog 60, the upper end of which has an aperature in it through which the driving stem 46 extends. Carried on the driving stem 46 between the upper end of the dog and the end of the cap 16 is a spring 61. By pulling on the trigger or actuating member 32 the dog 60 is moved forwardly against the spring 61. It grabs or grasps the stem 46 and causes it to be driven forward moving disk 56 against the piston 54 in the cartridge to force the caulking compound out of the nozzle 52. When the trigger 32 is released the dog 60 is moved rearwardly under the force of the spring 61 without moving the operating stem 46. When the lower end of the dog 60 is moved by stem 46 it is canted so that its position is now normal to stem 46 so that it grasps the stem.

Normally when the caulking is discontinued and the trigger 32 is released the pressure on the stem 46 and disk 56 will be released so as not to cause caulking compound to continue to be expelled from the nozzle 52. That is the stem can now move freely in a rearward direction through dog 60.

Positioned on the stem 46 in a predetermined position is the abutment 66 shown as a collar, which can come into engagement with the back wall of the handle 22. It is positioned so that it thus engages against the handle and stops movement of the stem 46 when the disk 56 reaches a position wherein the piston 54 in the cartridge is against or substantially against the inside surface of the end cap 12. In this manner it is no longer possible to drive the stem forward any further and thus it is not possible to break the end cap 12 away from the gun. That is the stem 46 and the disk 56 can be retracted rearwardly, but cannot be moved forwardly any further. FIG. 1 illustrates two positions of disk 56 illustrating movement through the distance A of the piston 54 and collar 66.

Figure 2:
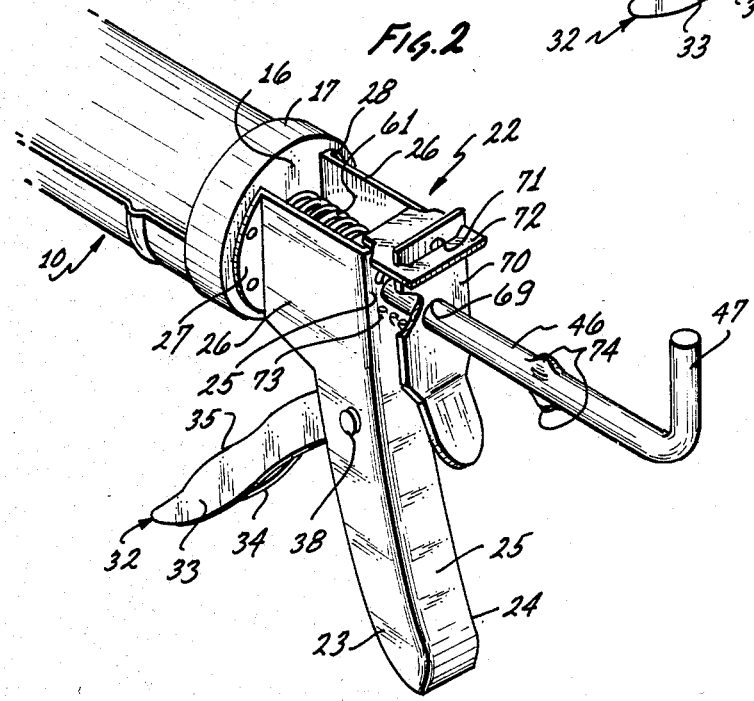
FIG. 2 is a partial cut away view of a second form of the invention.

FIG. 2 is a partial view of a form of caulking gun which includes a stop latch member or dog 70 which is carried by bracket 72 extending from the handle 22. The latch or dog member 70 extends through a slot 71 in bracket 72 the upper end of the dog being wider as shown. The stop latch member 70 has a hole 69 in it though which the stem 46 passes. Numeral 73 identifies a coil spring between stop latch member 70 and the back wall 25 of the handle 22. The hole in the stop latch member 70 will normally prevent backward or rearward movement of the stem 46 unless the stop latch member is moved forward against the spring 73 by the thumb in order to release the stem 46 for rearward movement by canting dog 70 out of its holding position. In this construction the stop latch member 70 can be actuated so as to release the force on the stem 46 and disc 56 to prevent continued flow of compound from the nozzle 52. The gun of FIG. 2 is otherwise like that of FIG. 1.

Numeral 74 designates an abutment on stem 46 which is in a predetermined positioned on the stem. It is in a position such that foreward movement of the stem will be positively blocked and prevented when the stem 46 and disk 56 reach a position wherein, as described in the foregoing, further forward movement could force the end cap 12 off the end of the gun by breaking it loose from the cradle 10. The abutment or stop member 74 will engage with the latch member 70 moving it forward to release so that force exerted on the stem 46 and the disk is thus automatically released when the stem 46 and the disk 56 have been moved to a predetermined forward position as described. Thus, it is to be seen that even if the operator attempts to continue operating the caulking gun after the stem 46 and disk 56 reach a position in which damage could occur to the end cap 12, the force on the stem 46 is automatically released when the trigger 32 is released and also forward movement of the stem 46 is prevented. It will be observed that dog 70 pivots about its mounting in bracket 70. The hole 69 is closer to bracket 72 than the lower end of dog 70 which can be engaged by the thumb. Thus the movement of abutment 66 to effect release is less than movement applied to the end of dog 70.

From the foregoing those skilled in the art will readily appreciate and understand the nature of the invention and the manner in which it achieves the objectives set forth in the foregoing.

The foregoing disclosure is representative of preferred forms of the invention and is to be interpreted in an illustrative rather than a limiting sense the invention to accorded the full scope of the claims appended hereto.

What is claimed:

1. In a caulking gun of the type having a cradle in the form of a half cylinder having a rear end part and having a front end member attached to it, adapted to receive a cartridge of caulking material having a piston member in it and having an end dispensing nozzle, the front end member having an opening adapted to receive the nozzle, the gun having a handle member attached to the said rear end, an actuating stem extending through the handle member and through the rear end part and carrying a disk member engageable with the piston member of the cartridge, a trigger member formed of sheet metal and having side walls, a transverse member extending between said side walls, a dog engageable with the stem for reciprocating it positioned to be actuatable by the trigger, the said dog having a part extending between said side walls and engaging said transverse member, a coil spring on said stem normally urging the dog in a rearward direction, an abutment member carried by the said stem in a position to engage a part of the gun to limit forward movement of the stem to prevent the said disk member from driving the cartridge piston against the said front end member in a manner to break the front end member away from the cradle, a latch member carried by the said handle member, the latch member being in the form of a latch dog engageable with the said stem for holding the stem against reverse movement requiring that the latch dog be actuated to release the stem, the said abutment member being positioned on the stem whereby to engage the said latch dog so as to actuate the said latch dog to release the stem so as to release the pressure on the cartridge piston, and to prevent continued forward movement of the stem, the latch dog being mounted for angular movement, the stem extending through an aperture in the latch dog at a position requiring relatively small movement of the latch dog to effect release, the said handle having an extending bracket having a slot in it, the latch dog having a part extending through said slot for mounting it.

* * * * *